United States Patent [19]

Mederer

[11] 3,926,389
[45] Dec. 16, 1975

[54] AIRCRAFT OF A CONTROLLABLE STABILITY

[75] Inventor: Andreas Mederer, Markt Schwaben, Germany

[73] Assignee: Messerschmitt-Bolkow-Blohm GmbH, Munich, Germany

[22] Filed: Aug. 9, 1974

[21] Appl. No.: 496,119

Related U.S. Application Data

[63] Continuation of Ser. No. 362,854, May 22, 1973, abandoned.

[30] Foreign Application Priority Data

May 24, 1972 Germany............................ 2225169

[52] U.S. Cl.................. 244/45 A; 244/2 R; 244/52;
   244/76 R
[51] Int. Cl.[2] ........................ B64C 5/04; B64B 1/36
[58] Field of Search ...... 244/52, 45 A, 48, 46, 3.22,
   244/75 R, 12 R, 12 D, 42 CC, 76 R, 76 J, 13

[56] References Cited
UNITED STATES PATENTS

| | | | |
|---|---|---|---|
| 2,654,552 | 10/1953 | Jonas................................ | 244/3.22 |
| 2,765,993 | 10/1956 | Custer.................................... | 244/52 |
| 2,793,826 | 5/1975 | Fiedler.................................. | 244/46 |
| 3,069,117 | 12/1962 | Reid..................................... | 244/52 |
| 3,114,520 | 12/1963 | Finvold................................. | 244/52 |
| 3,355,125 | 11/1967 | Allcock......................... | 244/42 CC |
| 3,438,581 | 4/1969 | Smith................................... | 244/52 |
| 3,730,458 | 5/1973 | Haberkorr........................... | 244/47 |

FOREIGN PATENTS OR APPLICATIONS

2,049,643  10/1970  Germany............................ 244/46

Primary Examiner—George E. A. Halvosa
Assistant Examiner—Galen L. Barefoot
Attorney, Agent, or Firm—Woodhams, Blanchard and Flynn

[57] ABSTRACT

In order to provide an artificial stability for aircraft under varying conditions of lift adjustment, and particularly wherein the aircraft has a directable jet which is depressed under conditions of high lift, there is provided ahead of the fixed wings of the aircraft an auxiliary retractable wing construction which can be moved backwardly against the fixed wing when the aircraft is under cruising conditions and can be moved forwardly when the aircraft is climbing. Thus, the center of lift is moved rearwardly when the jet is directed substantially rearwardly but the center of lift is moved forwardly as needed to compensate for the instability otherwise created when the jet is moved downwardly under conditions of high lift. Preferably, the position of the auxiliary wing and of the jet are operationally interconnected to coordinate their positional relationships.

4 Claims, 4 Drawing Figures

AIRCRAFT OF A CONTROLLABLE STABILITY

This is a continuation, of application Ser. No. 362 854, filed May 22, 1973, now abandoned.

FIELD OF THE INVENTION

The invention relates to an aircraft of controllable stability having means for producing both lift and thrust.

BACKGROUND OF THE INVENTION

The artificial stabilization of the longitudinal axis of an aircraft is basically known. A typical device consists substantially of a redundant flight control, which controls the means providing stabilizing moments for the aircraft, as for example the horizontal tail unit. In the case of the artificial stabilization it is possible to select the distribution of the entire lift on wing and horizontal tail unit for obtaining optimum conditions of flight performance. This is accomplished by a suitable selection of the position of the center of gravity of the aircraft.

However, under conditions of such distribution of the lift of selection of the center of gravity for optimum flight performance, there usually results a statically unstable aircraft which is characterized by a center of gravity position being behind the neutral point. Through the imposing of selectable controls onto the means producing stabilizing moment, such an aircraft can be made again statically stable in a artificial manner. The principle of artificial stabilization can be used particularly advantageously in STOL aircraft. Up to now, it has in such aircraft been known to produce lift-thrust either by means of an engine arranged in the center of gravity of the aircraft or by means of appropriate directing of the thrust jet in such a manner that the resulting lift-thrust vector extends through the center of gravity of the aircraft.

These known means have the disadvantage that either a dead weight is carried along during normal flight or that an awkward engine arrangement is created.

Further, it is known to provide for STOL purposes a canard wing with flaps or high-lift means which generally has the purpose of increasing the wing/fuselage-lift vector and to move same forwardly without, however, making the aircraft thereby statically unstable.

The basic purpose of the invention is to avoid the deficiencies of the present solutions and to produce an aircraft which has on the one hand the advantages of the known STOL aircraft, such as the lift-thrust use and the canard wing, without having to accept their disadvantages, such as the dead weight of the lift engine in the normal flight or the awkward arrangement of the engine.

SUMMARY OF THE INVENTION

This purpose is attained by the combination of the following characteristics, namely a. a regulating device for producing artificial stability in the longitudinal direction, b. a fore-wing which can be extended and c. a directable nozzle which is coupled with the fore-wing through a control on the aircraft tail for producing both lift and thrust.

The invention further provides that the extendable fore-wing is constructed so that it forms in the retracted position a continuation of the main wing, in a slightly moved out position a fore-wing cooperating with the main wing and in the fully moved out position a forwardly positioned auxiliary wing.

Through this arrangement there can be obtained the advantages of a continuous wing, of a nose slot and of a canard wing which is suitably arranged in front of the main wing.

In a known manner the fore-wing can have flaps and a vent means for high-lift production.

According to further characteristics of the invention it is possible to produce the artificial stability by varying the direction of the thrust jet or by adjustment of the horizontal tail unit. The inventive combination operates as follows:

For the STOL, either or both of the fore-wing or the directable nozzle is moved into the optimum position for lift-off. The movement of both elements is coupled by a control so that the moment balance around the transverse axis is maintained. Advantageously in combination with a high-lift-thrust (produced by thrust vector rotation on the aircraft tail) there is provided a large swingable fore-wing. However, in this case in a fully moved out condition of the fore-wing an aerodynamic longitudinally unstable configuration is obtained. It is now possible to make the aircraft artificially longitudinally stable through the flight control by suitable controlling of the horizontal tail unit or, also by control of the directable nozzle if same is constructed as a dynamic nozzle.

BRIEF DESCRIPTION OF THE DRAWINGS

The invention is illustrated in the drawings, in which:

FIG. 4 is an enlarged cross-sectional view of the fore-wing along the line IV—IV of FIG. 3.

DETAILED DESCRIPTION

Figure 1:
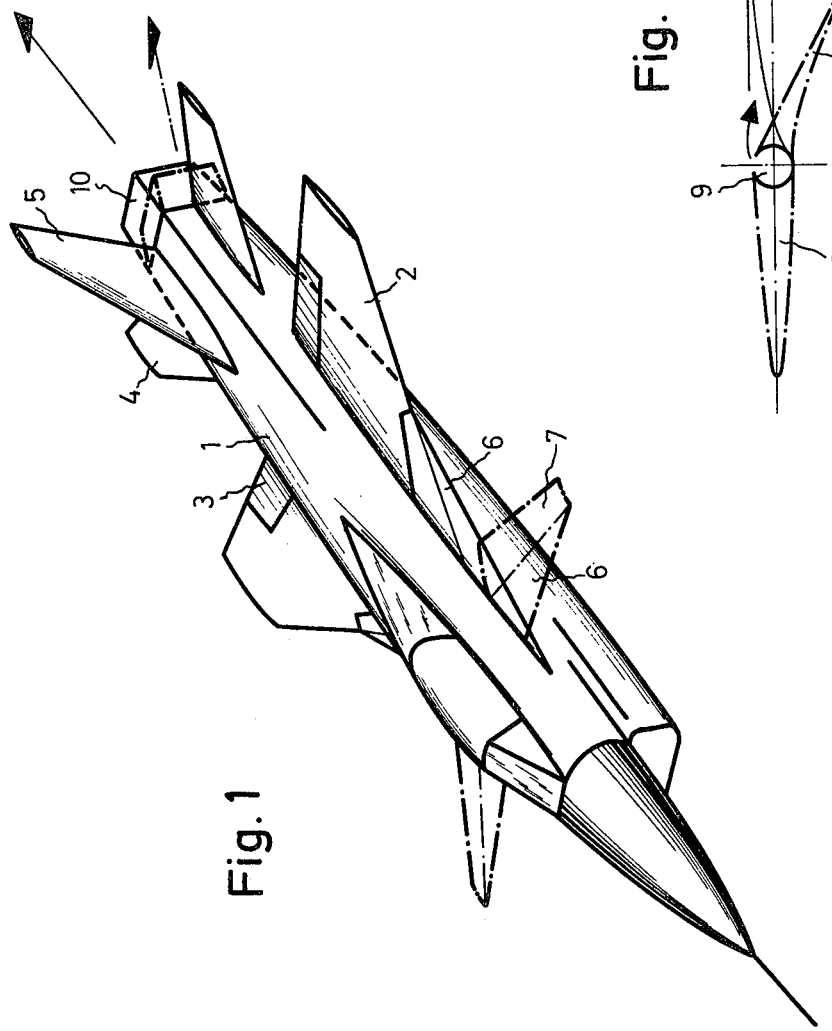
FIG. 1 is a perspective view of the aircraft, wherein the extended position of the fore-wing and of the nozzle are illustrated in dash-dotted lines.
Figure 2:
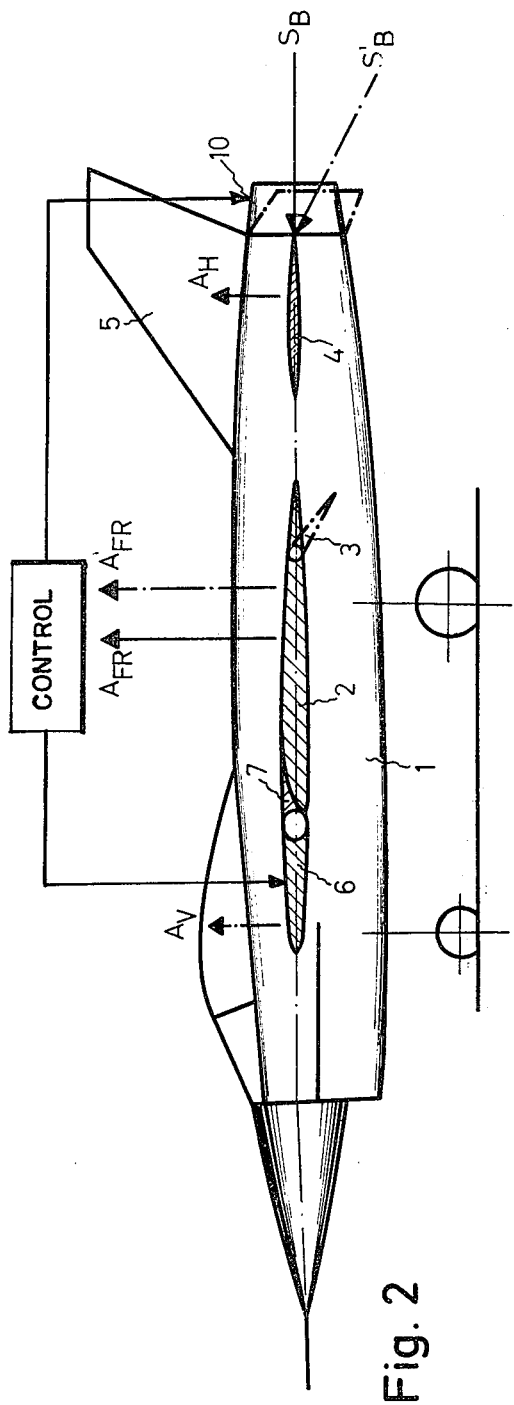
FIG. 2 is a side view of the aircraft, wherein the wing and the horizontal tail unit are cut along the line II—II of FIG. 3.
Figure 3:
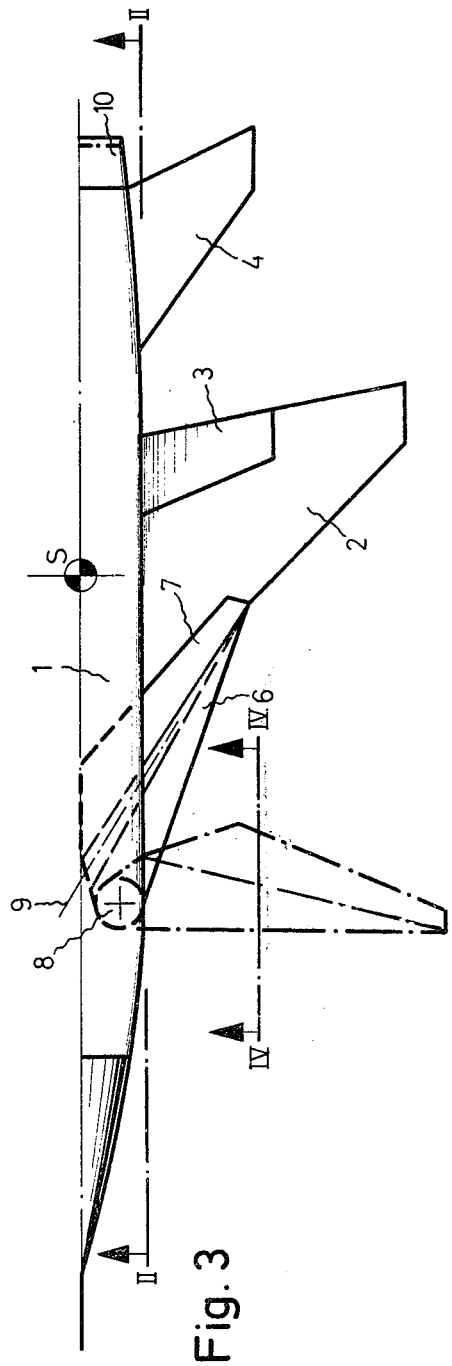
FIG. 3 is a top view of the aircraft in which the extended position of the fore-wing and the directable nozzle are illustrated in dash-dotted lines.

In FIGS. 1, 2 and 3, reference numeral 1 identifies the fuselage and 2 the fixed main wing. Reference numeral 3 identifies high-lift means for takeoff and landing in the form of flaps which are pivotally secured on the main wings. The horizontal stabilizers 4 and the vertical stabilizer 5 are arranged at the tail of the aircraft. Reference numeral 6 identifies the fore-wings which are pivotable about the vertical axis 8. The fore-wings advantageously have the large flaps 7 which are pivotable about the axis 9. A directable nozzle 10 is mounted at the tail of the aircraft. The position of the fore-wings 6 and of the nozzle 10 illustrated in full lines in FIGS. 1, 2 and 3, is that used during normal flight. The position of the fore-wings and of the nozzle illustrated in dash-dotted lines, is used for the STOL in which position the fore-wing is extended and the nozzle is turned downwards. FIG. 4 illustrates in an enlarged scale a cross section of the fore-wing 6 in extended position. The large flap 7 is here pivoted about the axis 9 and is in high-lift position. The arrow illustrated in this figure indicates the possibility of bleeding air from the flap slots shown.

The flight conditions are illustrated by the vectors appearing in FIG. 2 as follows:

The lifting force and thrust on the aircraft are shown for normal flight or for STOL by the arrows $A_{FR}$, $A_H$ and $S_B$ or $A_{V'}$, $A'_{FR}$, $A_H$ and $S'_B$. They mean $A_{V'}$ the lift on the extended fore-wing 6, $A_{FR}$ the lift on the main wing 2 including the retracted fore-wings and on the fuselage 1, $A'_{FR}$ the lift on the main wing 2 with extended high-lift means 3 and on the fuselage 1, $A_H$ the lift on the horizontal tail unit 4, $S_B$ the thrust of the nozzle 10, $S_B'$ the thrust of the nozzle 10 in high-lift position.

In the normal flight position the forces are $A_{FR}$, $A_H$ and $S_B$; in the STOL position the forces are $A_{V'}$, $A'_{FR}$, $A_H$ and $S'_B$. It is apparent that in the normal flight situation the lift force $A_{FR}$ lies slightly in front of the center of gravity S of the aircraft. The tail-heavy moment so created is balanced by an oppositely directed moment which is produced by the horizontal tail unit lift $A_H$. The thrust vector $S_B$ during normal flight (as seen in FIG. 2) does not produce a moment.

In the STOL case the vector of the wing fuselage lift $A'_{FR}$ moves rearwardly due to the extending of the flaps; further the lift vector $A_{V'}$ on the extended fore-wing is produced far in front of the center of gravity. Both lift vectors $A'_{FR}$ and $A_{V'}$ result together in a (not illustrated) resulting lift vector which lies farther forwardly than the normal flight position of $A_{FR}$. In this manner there is provided a lift vector positioned farther forwardly than in the normal flight situation which moment is balanced by a counter moment produced by means of rotation of the thrust vector $S_B$ into the position $S_B'$.

The control means operationally connecting the fore-wing position selecting device with the position selecting device for the directable nozzle may be of any conventional type, mechanical, electrical, pneumatic or hydraulic and is schematically shown in FIG. 2. Such position controlling apparatus is well known in the art and hence needs no further detailing here, excepting that it will be clearly understood that such means are provided as will controllably relate the positions of the fore-wings with the directable nozzle to each other either in a preselected relationship and/or as determined in a given case by the pilot.

The described device has aside from the above-listed advantages also the additional advantage that the lift-thrust vector can be used at any time by means of a control command by controlling both the nozzle and the fore-wings into appropriately related positions.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. An apparatus for use on an aircraft to maintain a stabilized flight of an aircraft about a center of gravity thereon, comprising:
   propulsion means for propelling a gaseous jet rearwardly from the aft end of said aircraft;
   movable nozzle means mounted in the flow path of said gaseous jet to control the direction of discharge of said gaseous jet along a variable flow axis relative to the longitudinal axis of said aircraft, said movable nozzle means being movable between a first position wherein the controlled discharge flows along said flow axis to thereby develop solely a thrust force for propulsion of said aircraft and a second position wherein the controlled discharge flows along a flow axis inclined downwardly to said longitudinal axis of said aircraft to thereby develop both a thrust force for propulsion of said aircraft and a first lifting moment about said center of gravity of said aircraft at the tail end thereof;
   a fixed wing for aerodynamic support of said aircraft and having extendible flap means movably mounted thereon;
   a vertical tail surface;
   a horizontal tail surface, said horizontal tail surface developing, during flight, a second moment about said center of gravity of said aircraft at the tail end of said aircraft;
   a movable fore-wing shorter in length than said fixed wing mounted forwardly of said fixed wing and adapted to move about means defining a vertical pivot axis secured to means defining the fuselage for said aircraft between first and second positions, said fore-wing having first leading edge surface means and said fixed wing having second leading edge surface means, said first leading edge surface means, when said fore-wing is in said first position, forming a continuation of said second leading edge surface means on said fixed wing so that said first and second leading edge surface means together define a single leading edge surface, said fore-wing in said first position and said fixed wing together developing, during flight, a third lifting moment about said center of gravity, said third lifting moment being located just slightly in front of said center of gravity, said second lifting moment and said third lifting moment being generally equal to each other when said movable nozzle means is in said first position to thereby achieve a first stabilized flight characteristic, said fore-wing, in said second position, being spaced forwardly of said fixed wing and defining a separate auxiliary wing and separate first and second leading edge surface means, and said fixed wing, with said flap means in the extended position, each generating separate fourth and fifth moments, respectively, about said center of gravity, the sum of said fourth and fifth moments defining a sixth lifting moment located forwardly of said center of gravity and being greater in magnitude than said second lifting moment, the sum of said second lifting moment and said first lifting moment developed by said movable nozzle means in said second position being generally equal to said sixth moment to thereby achieve a second stabilized flight characteristic; and
   control means for relating the movement of said movable nozzle means and the movement of said fore-wing to develop said first and second stabilized flight characteristics.

2. An apparatus for use on an aircraft to maintain a stabilized flight of an aircraft about a center of gravity thereon, comprising:
   propulsion means for propelling a gaseous jet rearwardly from the aft end of said aircraft;
   movable nozzle means mounted in the flow path of said gaseous jet to control the direction of discharge of said gaseous jet along a variable flow axis relative to the longitudinal axis of said aircraft, said movable nozzle means being movable between a first position wherein the controlled discharge flows along said flow axis to thereby develop solely a thrust force for propulsion of said aircraft and a second position wherein the controlled discharge flows along a flow axis inclined downwardly to said longitudinal axis of said aircraft to thereby develop both a thrust force for propulsion of said aircraft and a first lifting moment about said center of gravity of said aircraft at the tail end thereof;

a fixed wing for aerodynamic support of said aircraft and having extendible flap means movably mounted thereon;

a vertical tail surface;

a horizontal tail surface, said horizontal tail surface developing, during flight, a second moment about said center of gravity of said aircraft at the tail end of said aircraft;

a movable fore-wing mounted forwardly of said fixed wing and adapted to move between first and second positions, said fore-wing in said first position and said fixed wing together developing, during flight, a third lifting moment about said center of gravity, said third lifting moment being located just slightly in front of said center of gravity, said second lifting moment and said third lifting moment being generally equal to each other when said movable nozzle means is in said first position to thereby achieve a first stabilized flight characteristic, said fore-wing, in said second position being spaced forwardly of said fixed wing, and said fixed wing, with said flap means in the extended position, each generating separate fourth and fifth moments, respectively, about said center of gravity, the sum of said fourth and fifth moments defining a sixth lifting moment located forwardly of said center of gravity and being greater in magnitude than said second lifting moment, the sum of said second lifting moment and said first lifting moment developed by said movable nozzle means in said second position being generally equal to said sixth moment to thereby achieve a second stabilized flight characteristic; and control means for relating the movement of said movable nozzle means and the movement of said fore-wing to develop said first and second stabilized flight characteristics.

3. An apparatus according to claim 2, wherein said fore-wing has conventional flaps and vent means for creating a high-lift force.

4. An apparatus according to claim 2, wherein said fourth moment is located in front of said center of gravity and said fifth moment is located just slightly to the rear of said center of gravity.

* * * * *